C. LE G. FORTESCUE.
RECTIFIER SYSTEM.
APPLICATION FILED JUNE 21, 1912.

1,112,282.

Patented Sept. 29, 1914.
2 SHEETS—SHEET 1.

WITNESSES:

INVENTOR
Charles Le G. Fortescue
BY
ATTORNEY

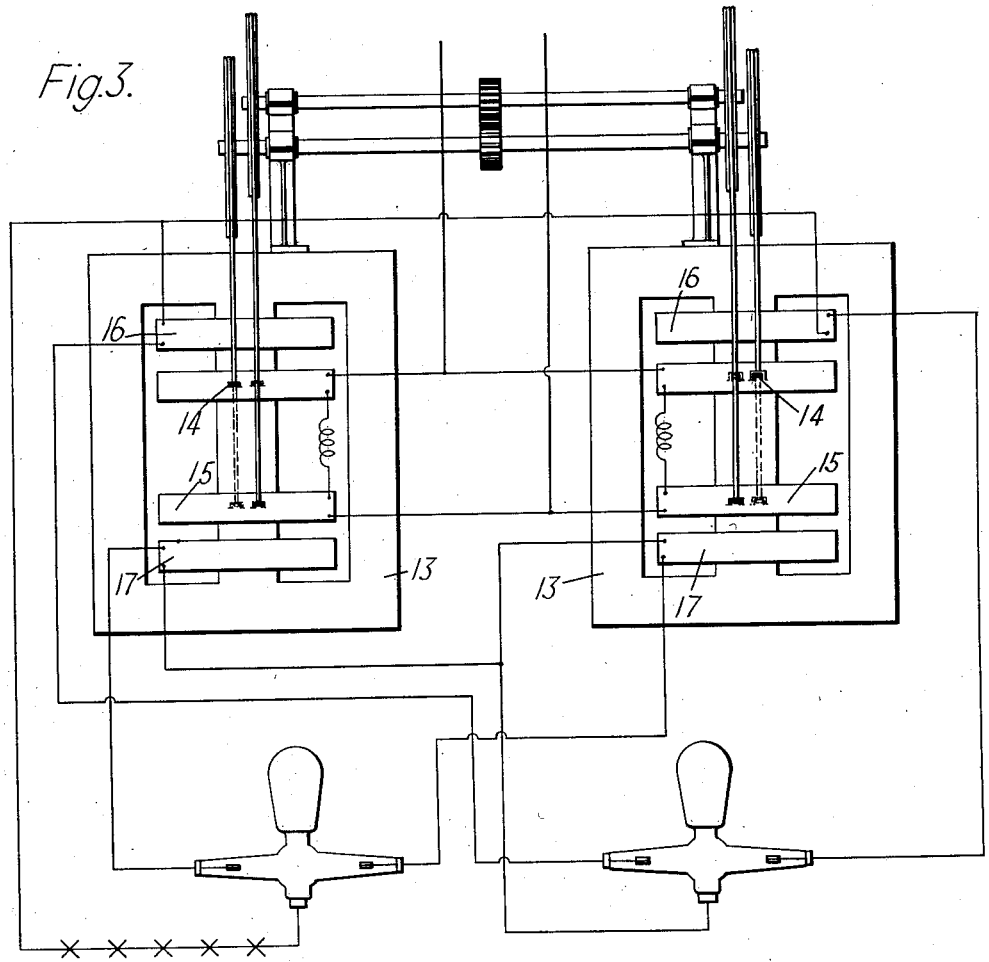

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

RECTIFIER SYSTEM.

1,112,282.  Specification of Letters Patent.  Patented Sept. 29, 1914.

Application filed June 21, 1912. Serial No. 705,013.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Rectifier Systems, of which the following is a specification.

My invention relates to systems of distribution in which alternating current is rectified, and particularly to such systems as involve the use of mercury vapor or similar rectifiers.

The object of my invention is to provide a system of the character indicated in which the current that flows upon the occurrence of a short circuit in the rectifying apparatus is limited to a harmless value. The effect of limiting the short circuit current is also to render the occurrence of short circuits difficult and infrequent.

Figure 1:
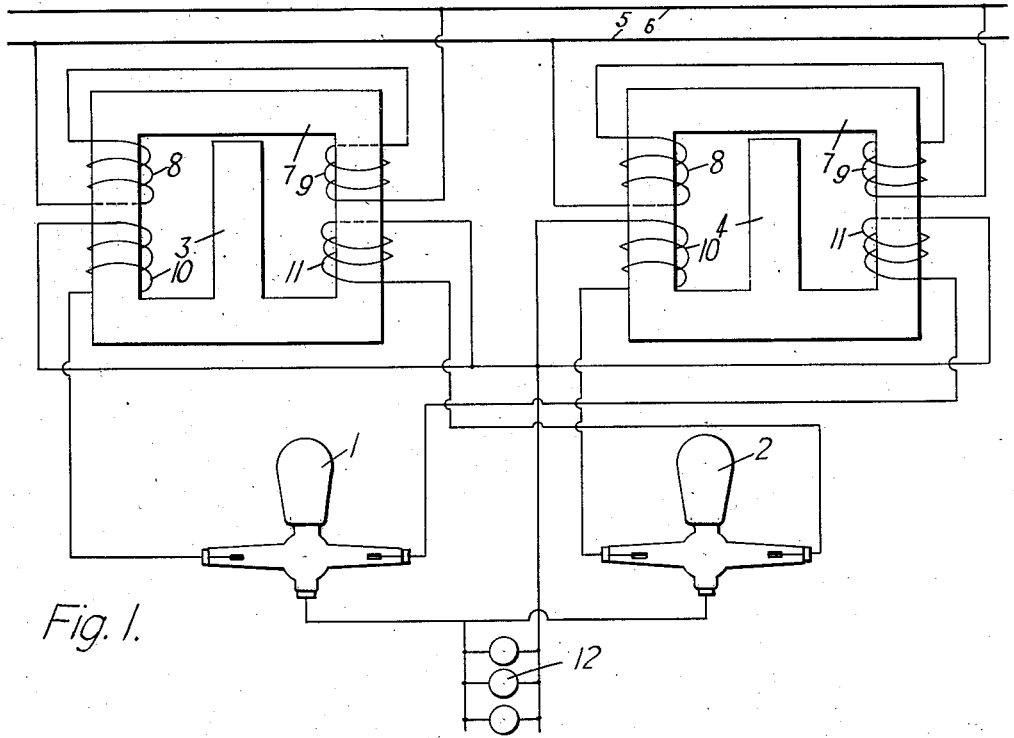
Figure 2:
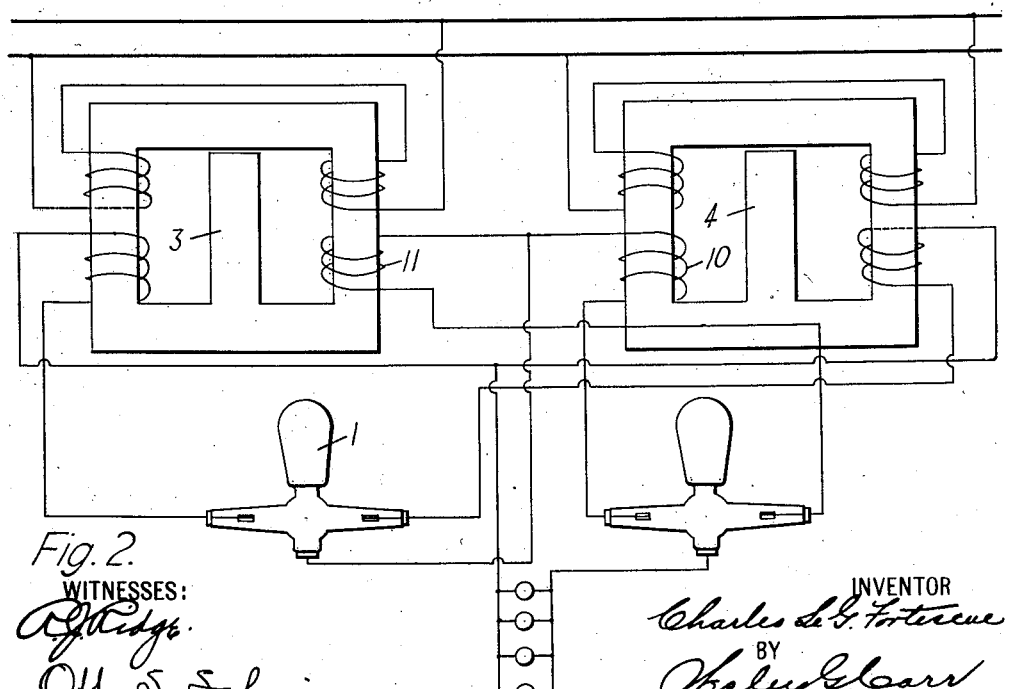

My invention is illustrated in the accompanying drawings, Figure 1 of which is a diagrammatic view of a system of distribution embodying the same, and Figs. 2 and 3 are similar views of modifications of the system of Fig. 1.

The present system comprises two mercury-vapor or other suitable current-rectifying devices 1 and 2 and two transformers 3 and 4, through which current is supplied to the rectifiers from an alternating current circuit 5—6. Each of the transformers 3 and 4 comprises a core 7, of the general form of the core of a shell type transformer and comprising three legs, the middle one of which constitutes a leakage path and is preferably provided with an air gap. The primary and secondary windings are placed upon the outer legs of the core member, and each of them comprises two coils 8 and 9, and 10 and 11, respectively, one coil of each winding being upon each of the outer legs. The two primary coils 8 and 9 of each transformer are connected in series relation, or are otherwise so arranged that they will be traversed by the same amounts of current, and the primary windings of the two transformers are connected in parallel relation to the supply circuit 5—6. One terminal of each of the secondary coils is connected to one terminal of a suitable distributing circuit 12, and the remaining terminals thereof are respectively connected to the anodes of the current rectifiers, the two anodes of each rectifier being respectively connected to the secondary coils of different transformers. The cathodes of the rectifiers are connected to the distributing circuit.

In the normal operation of the system, currents traverse the secondary coils 10 of the two transformers simultaneously and for the same half cycles of the alternating current, and they traverse the secondary coils 11 simultaneously during the other half cycles of the current. However, if a short circuit occurs in the rectifier 1, for instance, the short circuit current will traverse the secondary coils 10 of the transformer 3 and the secondary coils 11 of the transformer 4. Thus, only one-half of the secondary winding of each transformer is short-circuited, and the flow of the short-circuit current is opposed by the short-circuit impedances of the primary windings, which may be very large, and will serve to limit the current to a harmless value.

In the system of Fig. 1, the rectifiers are connected in parallel relation, but in Fig. 2 they are connected so that the current traverses them in series relation. The anodes of the rectifiers of Fig. 2 are connected in the same manner as the anodes of the rectifiers of Fig. 1, but the cathode of the rectifier 1 is connected to the terminals of the coils 10 and 11 of the transformers 4 and 3 respectively, and the terminals of the coils 10 and 11 are connected to one terminal of the distributing circuit. The operation of the system of Fig. 2 will be readily understood from the description of that of Fig. 1.

The present arrangement of connections is also adapted for employment in connection with regulators for maintaining the current constant in a distributing circuit that is supplied from current rectifiers, as shown in Fig. 3. In the regulators of Fig. 3, the core members 13 comprise three legs, the middle ones of which are surrounded by both the primary and the secondary coils, the primary coils 14 and 15 being disposed and movable between the secondary coils 16 and 17. The primary coils of the two regulators are preferably so connected and supported as to be caused to move simultaneously and correspondingly, and the electrical connections of the coils are similar to those of Figs. 1 and 2, the operation being also similar.

I claim as my invention:

1. The combination with two transformers each comprising two sets of primary and secondary coils, the mutual inductance between coils of the same set being greater than that between coils belonging to different sets, of two rectifying devices each of which is supplied from a secondary coil of each transformer.

2. The combination with two transformers each comprising two sets of primary and secondary coils, the mutual inductance between coils of the same set being greater than that between coils belonging to different sets, of two rectifying devices that are supplied from the secondary coils of the transformers.

3. The combination with two transformers each comprising two secondary coils, of two rectifying devices each of which is supplied from a secondary coil of each transformer.

4. The combination with two transformers each comprising a core having a plurality of legs, and a primary and secondary coil upon each leg, of two rectifying devices each of which is supplied from a secondary coil of each transformer.

5. The combination with two transformers each comprising a core having a plurality of legs, and a leakage path, and a primary and a secondary coil upon each leg, of two rectifying devices each of which is supplied from a secondary coil of each transformer.

6. The combination with two transformers each comprising two sets of primary and secondary coils, the mutual inductance between coils of the same set being greater than that between coils belonging to different sets, of two rectifying devices each of which is supplied from a secondary coil of each transformer, and the circuits of which are connected together.

7. The combination with two transformers each comprising two secondary coils, of two rectifying devices each of which is supplied from a secondary coil of each transformer, and the circuits of which are connected together.

In testimony whereof, I have hereunto subscribed my name this 18th day of June, 1912.

CHARLES LE G. FORTESCUE.

Witnesses:
   OTTO S. SCHAIRER,
   B. B. HINES.